United States Patent [19]

Kizaki et al.

[11] Patent Number: 4,671,634
[45] Date of Patent: Jun. 9, 1987

[54] LIQUID CRYSTAL PROJECTOR

[75] Inventors: Masaharu Kizaki, Tokyo; Shigeru Shibazaki, Saitama, both of Japan

[73] Assignee: Casio Computer Co., Ltd., Tokyo, Japan

[21] Appl. No.: 826,119

[22] Filed: Feb. 5, 1986

[30] Foreign Application Priority Data

Mar. 19, 1985 [JP] Japan ............................. 60-39310[U]
Sep. 25, 1985 [JP] Japan ................................. 60-211436

[51] Int. Cl.⁴ ............................................. G03B 21/00
[52] U.S. Cl. ..................................... 353/122; 353/38; 353/81
[58] Field of Search .................... 353/121, 122, 38, 69, 353/70, 81; 350/331, 333, 334, 452, 436, 127

[56] References Cited

U.S. PATENT DOCUMENTS 3,844,650 10/1974 Nicholson ........................... 353/122
3,895,866 7/1975 De Quervain et al. .

FOREIGN PATENT DOCUMENTS 2623190 11/1977 Fed. Rep. of Germany .
1401066 7/1975 United Kingdom ................ 350/333
20711864 9/1981 United Kingdom .

OTHER PUBLICATIONS

Abstract of New Technology from the Air Force Systems Command, N.T.I.S., Tech. Notes PB81-970247; "Liquid Crystal Diffraction Optics HUD".

Primary Examiner—Harry N. Haroian
Attorney, Agent, or Firm—Frishauf, Holtz, Goodman and Woodward

[57] ABSTRACT

A liquid crystal projector which comprises image light-refracting means for deflecting the direction in which ligh beams permeating liquid crystal display panel is projected on a screen by an angle corresponding to the suitable viewing angle of the liquid crystal display panel, and wherein image light thus refracted is thrown on a screen in an enlarged form by means of projection lens systems.

7 Claims, 9 Drawing Figures

LIQUID CRYSTAL PROJECTOR

BACKGROUND OF THE INVENTION

This invention relates to an improvement of a liquid crystal projector. A liquid crystal projector is generally used to display a television picture by means of, for example, a transparent TN type liquid crystal display panel, and to project said picture on the screen in an enlarged form.

The liquid crystal projector usually comprises a lamp set on the backside of the liquid crystal display panel. The lamp illuminates the backside of the liquid crystal display panel to brighten an image to be displayed. The image is enlarged by means of a projection lens system, thereby casting an enlarged picture on the screen set ahead.

As is well known, the TN type liquid crystal display panel has a specific viewing angle. The direction which an image displayed on the panel can be observed in the brightest form, is at a suitable viewing angle to the front side of the display panel. FIG. 1 illustrates the view field angle of the TN type liquid crystal display panel 11. The suitable viewing angle K is obtained by inclining Y axis toward X axis by angle $\alpha$ and inclining Z axis toward X-Y plane by angle $\beta$.

However, if, as in the conventional liquid crystal projector, the liquid crystal display panel is vertically set in parallel with the screen plane, then the suitable viewing angle of the liquid crystal display panel fails to coincide with the optical axis of the lens system of the liquid crystal projector, thereby obstructing the brightness and contrast of an image projected on the screen. To be free of said drawback, the conventional liquid crystal projector is so designed as to cause the liquid crystal display panel to face the screen in the form inclined to the perpendicular line of the optical axis by a proper view field angle. This arrangement can project the image of the liquid crystal display panel onto the screen under the condition of the highest brightness and best contrast.

Nevertheless, the conventional liquid crystal projector is accompanied with the drawbacks that since the liquid crystal display panel is inclined, variations arise in the distances between the points on the outer periphery of an image appearing on the liquid crystal display panel and the corresponding points on the outer periphery of an image cast on the screen; and consequently an image projected on the screen is warped to an extent corresponding to the inclination angle of said liquid crystal display panel. This event constituted the prominent defect of the conventional liquid crystal projector.

SUMMARY OF THE INVENTION

This invention has been accomplished to eliminate the drawbacks accompanying the conventional liquid crystal projector, and is intended to provide a liquid crystal projector comprising a TN type liquid crystal display panel, which can project a warpage-free image onto the projected on the screen under the condition of the highest brightness and best contrast, even when said liquid crystal display panel is set vertical to the optical axis of the projector.

To attain the above-mentioned object, this invention provides a liquid crystal projector which comprises: light source means; transparent TN type liquid crystal panel means for projecting an image received from said light source means on a screen in an enlarged form; means for optically deflecting the angle at which the image passing through the liquid crystal display panel is to be cast on the screen by an angle corresponding to the suitable viewing angle of said display panel means; and projection lens system means provided on said optical axis between said liquid crystal display panel means and screen to enlarge the image displayed by said liquid crystal display panel means.

The liquid crystal projector of this invention arranged as described above corrects the angle at which an image permeating the liquid crystal display panel means is cast on the screen, by the suitable viewing angle by the means for optically deflecting an image. Even when, therefore, the TN type liquid crystal display panel projector of this invention is set perpendicular to the optical axis of the projector, it can project a warpage-free image on the screen under the condition of the highest brightness and best contrast.

DETAILED DESCRIPTION OF THE PREFERRED EMBODIMENTS

Description may now be made, with reference to the accompanying drawings, of a liquid crystal projector according to a first embodiment of this invention.

Figure 1:
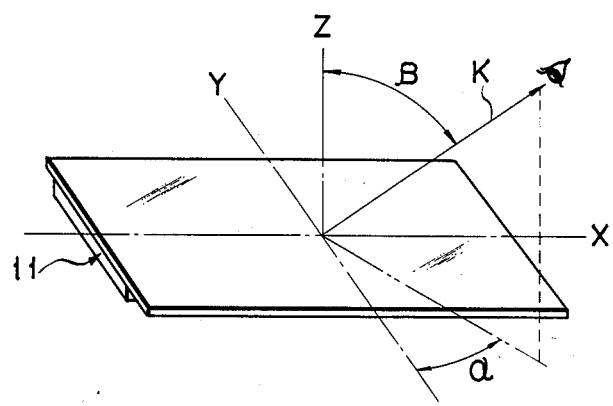
FIG. 1 is an oblique view illustrating the suitable viewing angle of a TN type liquid crystal display panel embodying this invention.
Figure 2:
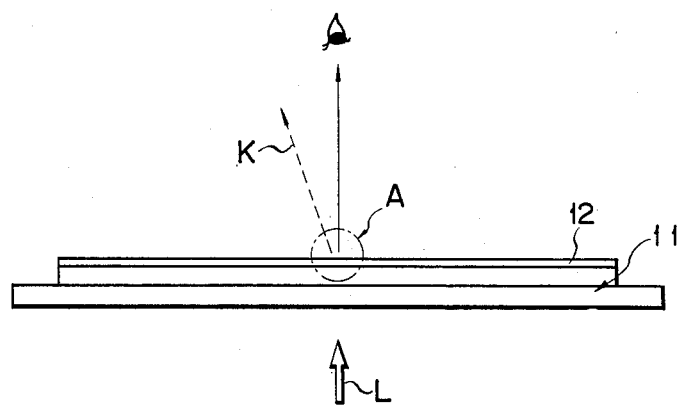
FIG. 2 shows a Fresnel lens laminated on a TN type liquid crystal display panel according to a first embodiment of this invention.
Figure 3:
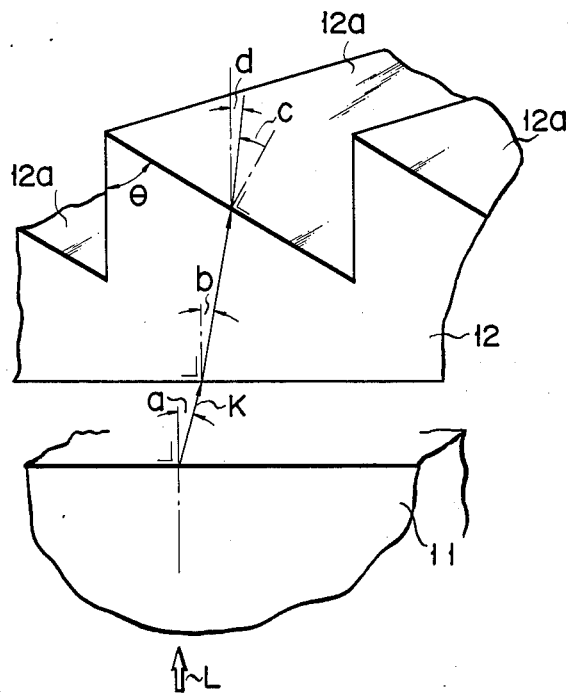
FIG. 3 indicates the manner in which an incoming light permeating the TN type liquid crystal display panel is deflected when passing through said Fresnel lens.

First, a liquid crystal display panel involved in the subject liquid crystal projector is described with reference to FIGS. 2 and 3. As shown in FIG. 2, a Fresnel lens 12 constituting a light-deflecting member is laminated over the substantially whole surface of a TN type liquid crystal display panel 11. As shown in FIG. 3, Fresnel lens 12 whose surface is provided with toothed portions (one plane of which is inclined and the other of which is set perpendicular to the base) is superposed on a transparent plate prepared from, for example, glass or acrylonitrile resin. Inclined plane 12a of the respective teeth defines angle $\theta$ with the base, and said teeth are arranged with the same pitch. The normal of said inclined plane 12a has the same direction as that (K) of the suitable viewing angle of TN type liquid crystal display panel 11.

Figure 4:
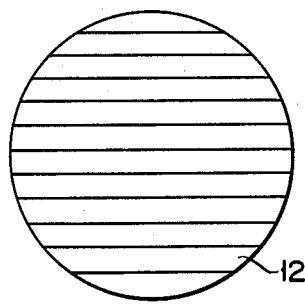
FIG. 4 is a plane view of a second embodiment of the invention involving a circular Fresnel lens.
Figure 5:
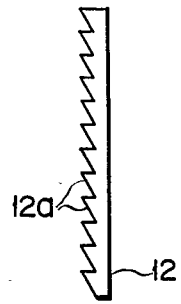
FIG. 5 is a side view of the circular Fresnel lens of FIG. 4.

Description may now be made, with reference to FIG. 3, of the light deflections effected by said Fresnel lens 12 in the suitable viewing angle. Now let it be assumed that illumination light L perpendicularly enters liquid crystal display panel 11 on the backside. In this case, the incoming light is deflected by angle a (i.e., the viewing angle characteristic of said TN type liquid crystal display panel 11) and projected in direction K. When entering Fresnel lens 12, said incident light deflected in direction K is further deflected at angle b to the vertical direction. A light which has passed through Fresnel lens 12 is further deflected at angle c from the vertical direction of the surface of said Fresnel lens 12. As a result, a direction perpendicular to the surface of said TN type liquid crystal display panel 11 defines an angle d with the direction in which a light is sent forth from Fresnel lens 12. Said angle d approximates zero. When, therefore, angle $\theta$ defined by the inclined plane 12a of the teeth provided on the surface of Fresnel lens 12 with said TN type liquid crystal display panel 11 is so preset as to cause the deflection direction of the light leaving Fresnel lens 12 to approach the perpendicular direction to the surface of said liquid crystal display panel 11, then it is possible to shift the suitable viewing angle K of the liquid crystal display panel 11 toward the perpendicular direction to the surface of the liquid crystal display panel 11. In this case, it will be sufficient if angle d approaches zero. Therefore, the inclined angle $\theta$ need not have a rigidly accurate level. Fresnel lens 12 can be fabricated by cutting out an inclined plane in a base having a spherical or any other form. Further, Fresnel lens 12 need not have its shape limited to the same rectangular form as liquid crystal display panel 11 but may assume a circular form (FIGS. 4 and 5).

Figure 6:
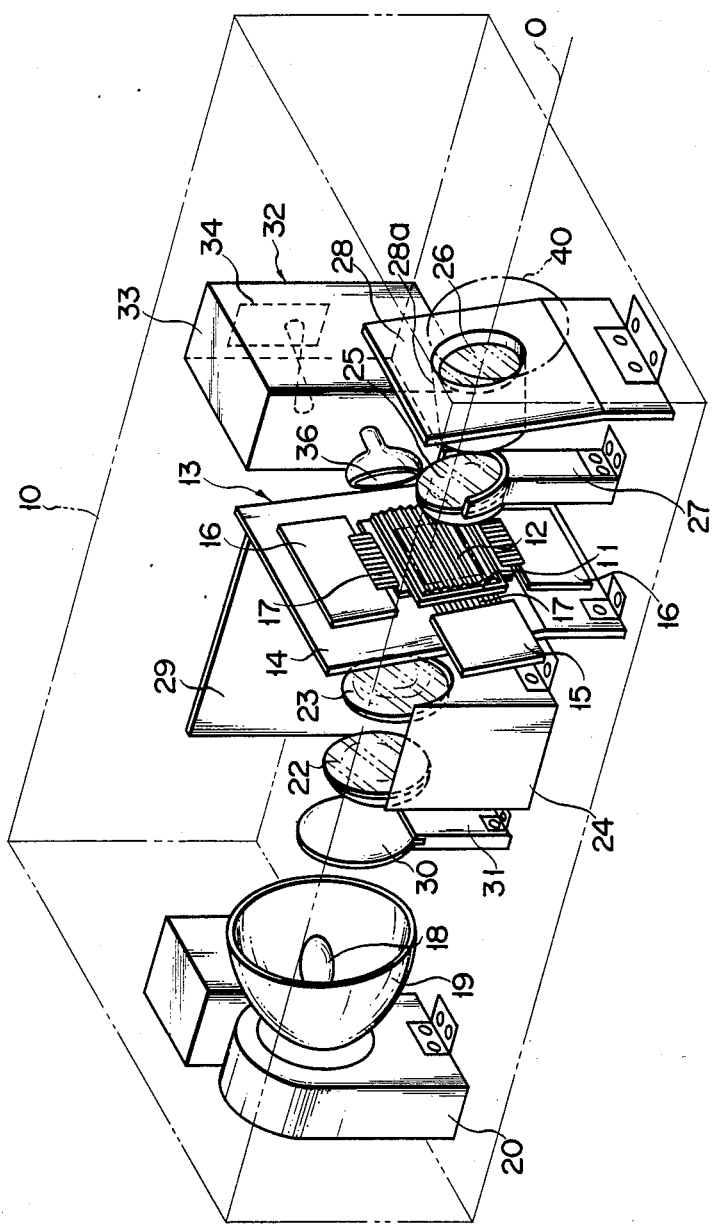
FIG. 6 is an oblique view indicating the whole of the liquid crystal projector of, the invention.

Description may now be made, with reference to FIG. 6, of the whole arrangement of a liquid crystal projector involving the aforesaid Fresnel lens 12 laminated on said liquid crystal display panel 11 to act as light-defecting means.

Liquid crystal display unit 13 is supported by support body 14 provided on the bottom wall of case 10, causing TN type transparent liquid crystal display panel 11 and Fresnel lens 12 superposed on said panel 11 to face projection window 40 formed in the front wall of case 10. One side of liquid crystal display panel 11 is fitted with substrate 15 of panel scanning side driving circuit. Provided above and below said substrate 15 are two circuit substrates 16 for driving the signal side electrode of panel 11. Said circuit substrate 15 and 16, are connected to the terminal assembly section of said liquid crystal display panel 11 by corresponding filmy heat seal connectors 17. In the rear part of case 10 is provided reflector 19 mounted on fitting board 20. Said reflector 19 is fitted with lamp 18 and contains a cold mirror. Capacitor lens 22 and relay lens 23 are interposed between said lamp 18 and liquid crystal display panel 11, while being securely set on lens support 24. Infrared ray absorbing filter 30 is interposed between, for example lamp 18 and capacitor 22 while being securely attached to fitting board 31.

Focusing lens 25 is securely set on lens support 27 ahead of said liquid crystal display panel 11. Projection lens 26 interposed between focusing lens 25 and projection window 40 of case 10 while being received in mirror cylinder 28a fitted to lens-fitting board 28.

Linear circuit substrate 29 is connected by cable to drive circuit substrates 15 and 16 of the respective display panels of the liquid crystal display unit 13, and also to a receiving unit equipped with, for example, a television wave-receiving circuit, voice-amplifying circuit and a speaker. Display panel cooler 32 is set aside of the liquid crystal display unit 13. Display panel cooler 32 involves fan 35. This fan 35 is held in casing 33 provided with suction section port 34. Flat cooling air outlet 36 is provided to blow the cooling air streams supplied from fan 35 toward liquid crystal display panel 11 of liquid crystal display unit 13.

When lamp 18 emits light, the image light delivered from TN type liquid crystal display panel 11 is refracted while passing through Fresnel lens 12. The refracted light beams move in a direction perpendicular to the surface of liquid crystal display panel 11. Even when, therefore, the screen and liquid crystal display panel 11 are set in parallel in a perpendicular direction to the optical axis, an image projected on the screen is free from warps or distortions, and indicates high brightness and satisfactory contrast.

Referring to the embodiment of FIG. 6, inclined plane 12a (FIG. 3) of the tooth portion of Fresnel lens 12 constituting the light-refracting section faces the screen.

Figure 7:
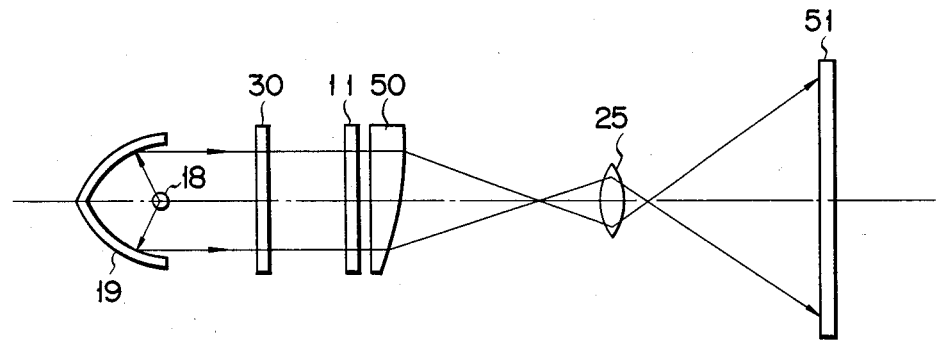
FIG. 7 shows a TN type liquid crystal display panel according to a third embodiment of the invention wherein an eccentric convex lens is applied as means for optically deflecting an image.
Figure 8:
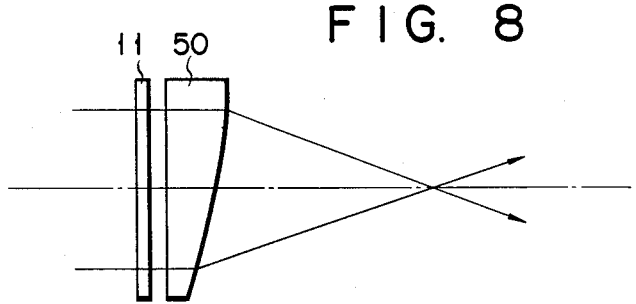
FIG. 8 is an enlarged view showing the manner in which a light is deflected by a spherical eccentric convex lens.
Figure 9:
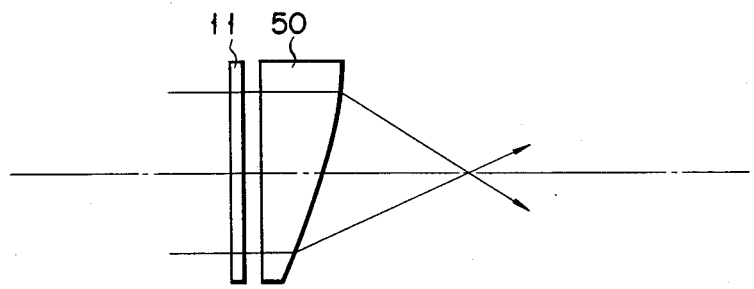
FIG. 9 is an enlarged view indicating the manner in which a light is deflected by a nonspherical eccentric convex lens.

Description may now be made with reference to FIGS. 7 to 9 of another embodiment wherein convex lens 50 employed as means for refracting light beams. As illustrated in FIG. 7, light beams from lamp 18 which have been reflected by reflector 19 are made to move in parallel and pass through infrared ray filter 30 and then into liquid crystal display panel 11. An image light permeating liquid crystal display panel 11 passes through eccentric convex lens 50 to be focused by refraction. The eccentric convex lens 50 is fabricated by cutting the ordinary flat convex lens in a vertical direction into two substantially equal parts. The eccentric convex lens 50 may be prepared from a spherical lens as shown in FIG. 8 or from a nonspherical lens.

Image light beams refracted and focused by eccentric convex lens 50 are thrown over screen 51 while being enlarged by projection lens 25. In the embodiment where eccentric convex 50 is used as light refracting means, an image light permeating liquid crystal display panel 11 can be focused by refraction without irregularities. Therefore, it is possible to project a good image free from stripes on screen 51.

What is claimed is:

1. A light crystal projector comprising:
  lighting means;
  transparent TN type liquid crystal display panel means for projecting an image illuminated by the light supplied from said lighting means toward a screen, said display panel means having a characteristic viewing angle deviating from a direction perpendicular to its plane at which an image displayed thereon can be observed in the brightest form;
  image light-refracting means for deflecting the direction in which an image light permeating the liquid crystal display panel is to be projected toward the screen by an angle corresponding to the viewing angle of said display panel means so that the deflected direction is substantially the same as the perpendicular direction; and
  projection lens means which is set on the optical axis between said liquid crystal display panel means and a screen to throw an image from the liquid crystal display panel means onto the screen in an enlarged form.

2. The liquid crystal projector according to claim 1, wherein said image light refracting means is formed of a Fresnel lens.

3. The liquid crystal projector according to claim 2, wherein said Fresnel lens is laminated over said liquid crystal display panel means while facing said lighting means.

4. The liquid crystal projector according to claim 2, wherein said Fresnel lens is laminated over said liquid crystal display panel while facing said screen.

5. The liquid crystal projector according to claim 1, wherein said image light refracting means is formed of an eccentric convex lens.

6. The liquid crystal projector according to claim 1, which further comprises:
lens means provided between said lighting means and liquid crystal display panel means to project image light beams delivered from the lighting means on the liquid crystal display panel means in the parallel form.

7. The liquid crystal projector according to claim 1, which further comprises an infrared ray absorbing filter which is interposed between said lighting means and liquid crystal display panel means to absorb infrared rays contained in a light projected from said lighting means.

* * * * *